(12) United States Patent
Nasiell

(10) Patent No.: US 7,845,080 B2
(45) Date of Patent: Dec. 7, 2010

(54) TUBING CUTTING APPARATUS

(76) Inventor: Gustav M. Nasiell, 746 Q Aveneda Majorca, Laguna Woods, CA (US) 92653

( * ) Notice: Subject to any disclaimer, the term of this patent is extended or adjusted under 35 U.S.C. 154(b) by 227 days.

(21) Appl. No.: 12/005,110

(22) Filed: Dec. 26, 2007

(65) Prior Publication Data

US 2009/0165306 A1    Jul. 2, 2009

(51) Int. Cl.
 *B21D 21/08*    (2006.01)
(52) U.S. Cl. .................. 30/101; 30/97; 30/95
(58) Field of Classification Search ............... 30/93, 30/95, 96, 97, 101–103, 123, 123.3; 82/46, 82/70.1, 70.2
See application file for complete search history.

(56) References Cited

U.S. PATENT DOCUMENTS

| | | | | |
|---|---|---|---|---|
| 3,672,050 A | * | 6/1972 | Hanback | 30/99 |
| 4,765,495 A | * | 8/1988 | Bisk | 211/113 |
| 4,769,911 A | * | 9/1988 | Araki | 30/94 |
| 4,802,278 A | * | 2/1989 | Vanderpol et al. | 30/97 |
| 5,088,196 A | * | 2/1992 | Fukuda | 30/102 |
| 5,152,230 A | * | 10/1992 | Licari | 108/158.11 |
| 5,243,760 A | * | 9/1993 | May, Jr. | 30/101 |
| 5,349,751 A | * | 9/1994 | Fahr | 30/102 |
| 5,836,079 A | * | 11/1998 | Cronin et al. | 30/101 |
| 6,065,212 A | * | 5/2000 | Lazarevic | 30/101 |
| 7,013,567 B2 | * | 3/2006 | Myers | 30/101 |
| 7,020,967 B2 | * | 4/2006 | Kimura | 30/95 |
| 7,406,769 B1 | * | 8/2008 | Toussaint | 30/93 |
| 2005/0076508 A1 | * | 4/2005 | Green et al. | 30/101 |
| 2005/0150113 A1 | * | 7/2005 | Shultis | 30/101 |
| 2007/0214648 A1 | * | 9/2007 | Lazarevic | 30/102 |

FOREIGN PATENT DOCUMENTS

| | | | |
|---|---|---|---|
| JP | 61121813 | * | 6/1986 |
| JP | 64042820 | * | 3/1989 |
| JP | 02-061524 | * | 5/1990 |
| JP | 07-266122 | * | 10/1995 |

* cited by examiner

*Primary Examiner*—Laura M. Lee
(74) *Attorney, Agent, or Firm*—William L. Chapin

(57) ABSTRACT

A tubing cutter apparatus including a rotary cutting mechanism having an open area for receiving a length of tubing and a cutting blade for engaging the tubing may be driven by a rotary power source such as a handheld power tool or a self-contained drive motor. The apparatus includes a gear system for rotating the cutting mechanism about the tubing and a coupling mechanism for coupling the rotary power source to the gear system. A clamp comprising a slotted tubular plate spring protruding from a handle case of the apparatus in longitudinal alignment with the open area of the cutting mechanism enables the apparatus to clampingly engage a length of tubing to be cut by pushing flanged edge walls of the slot against the length of tubing, which may be in a location with limited accessability, such as within the wall of a structure.

10 Claims, 11 Drawing Sheets

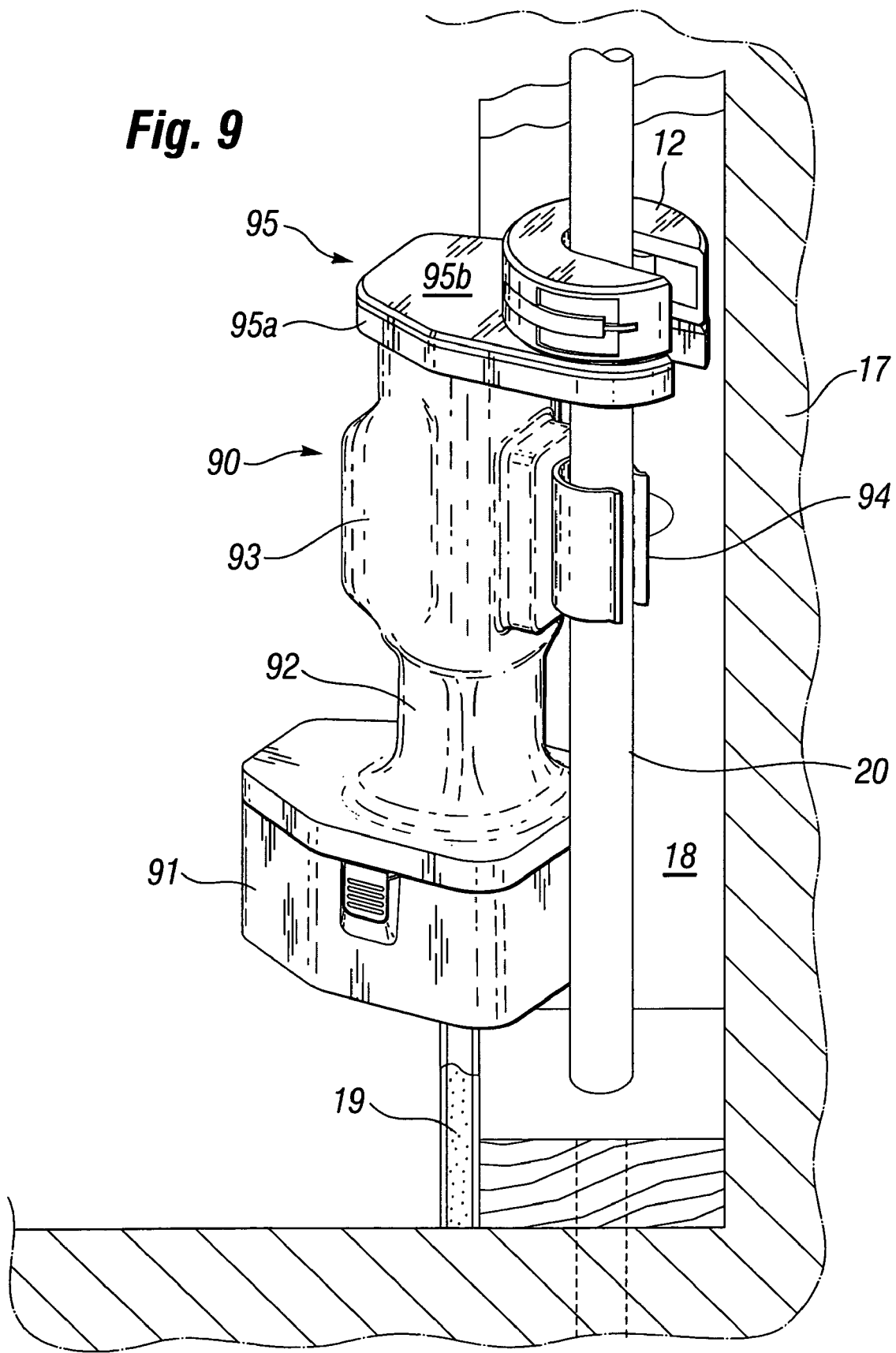

TUBING CUTTING APPARATUS

BACKGROUND

The background of the invention will be discussed in two parts.

FIELD OF THE INVENTION

The invention relates to tubing cutting apparatus for cutting copper tubing and the like, and more particularly, to handheld as well as hands-free apparatus wherein a power tool or self-contained battery power is used to activate or power the cutting mechanism.

PRIOR ART

A variety of tubing cutting devices have been developed over time having configurations generally adapted for use in cutting tubing in a circular path. Such cutting devices have progressed from the common hacksaw for sawing through the tubing to handheld rotatable "C" shaped cutting head structures wherein a cutting blade is clamped onto the tubing to be cut and then is rotated by hand about the tubing thereby cutting the tubing. Current state of the art structures incorporate electrical power for rotating the cutting mechanism around the tubing to perform the cutting operation. A search of the prior art has not disclosed the tube cutting apparatus of the present invention, however, devices of interest are shown and described in the following: U.S. Pat. No. 4,831,732 issued to Garton on 23 May 1989 relates to a handheld C-shaped structure which is clamped onto the tubing and then rotated by hand to perform the cutting of the tubing; and U.S. Pat. No. 4,890,385 issued to VanderPol, et al. on 2 Jan. 1990 relates to an automatic feed system for a powered tube cutter having a rotatable tube accommodating cutting head with a cutting arm pivotally attached to the cutting head.

In accordance with features of the present invention, there is provided a new and improved power operated automatic tubing cutting apparatus having a C-shaped structure which is easily clamped onto the tubing to be cut and is then power rotated about the tubing to perform the cutting operation. Three embodiments of the invention are provided, two configured to be hand held during the cutting operation and the other configured for hands-free attachment to the tubing during the cutting operation.

SUMMARY

In accordance with the present invention, there are disclosed embodiments of an improved tubing cutter apparatus which provides easier and faster modes of operation. The invention is particularly suitable for use either with battery power or with a handheld power tool for rotating the cutting mechanism about the tubing. It is also suitable for hands-free use wherein the apparatus is affixed to the tubing during the cutting operation. The tubing cutter apparatus includes a cutting mechanism having a central area for receiving a length of tubing and a cutting blade located in the central area for engaging the tubing. Provided is a gear system for causing rotation of the cutting mechanism about the tubing and a coupling mechanism for coupling a rotary driving element of a power tool or self-contained motor to the gear system for rotating the cutting mechanism. The foregoing and other objects, features and advantages of the invention will become readily apparent from a reading of the specification when taken in conjunction with the drawings in which like references numerals refer to like elements in the several views.

DRAWINGS

Figure 3:
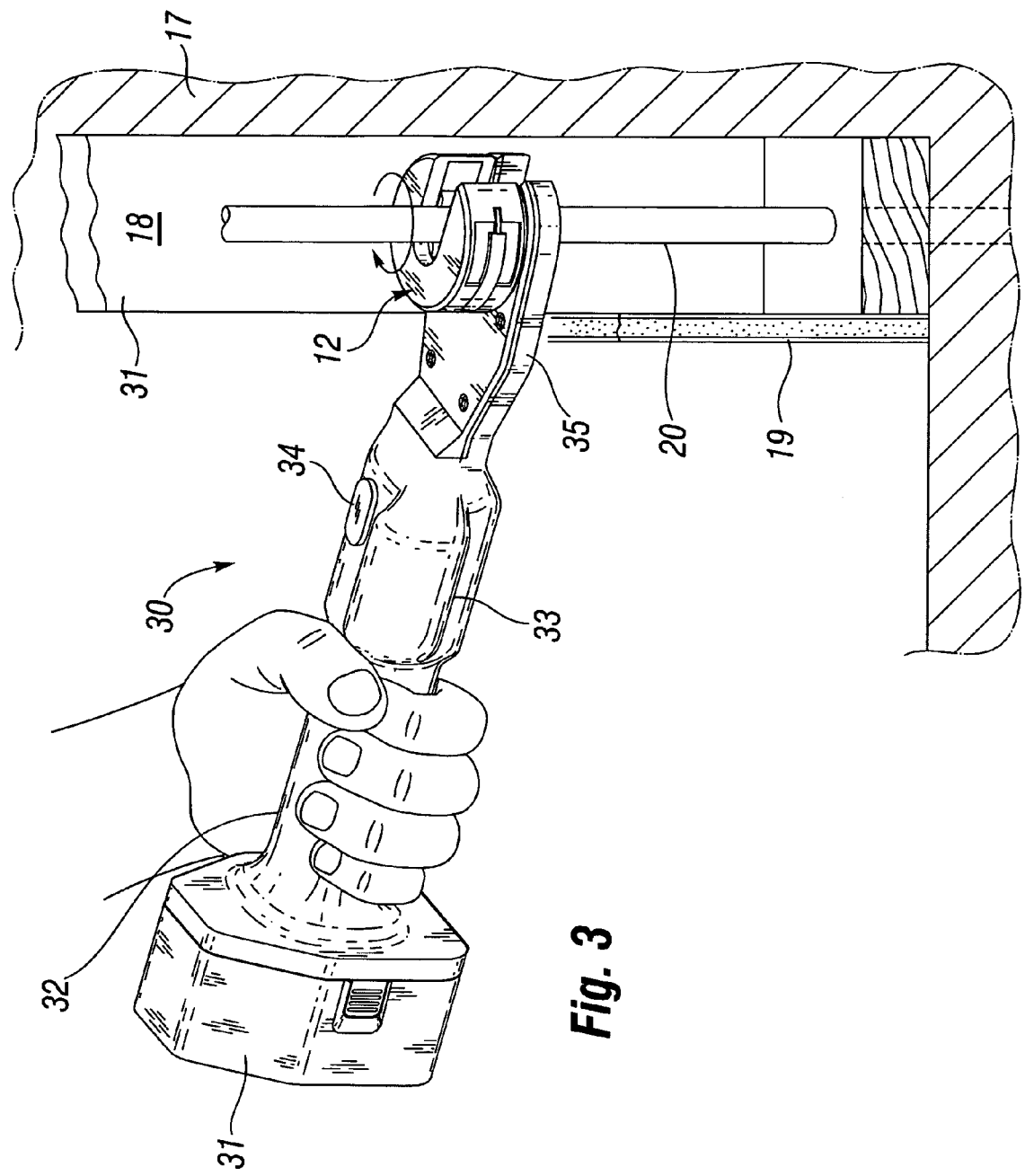
FIG. 3 is a perspective view illustrating a second embodiment of the tubing cutter apparatus in accordance with the invention.
Figure 4A:
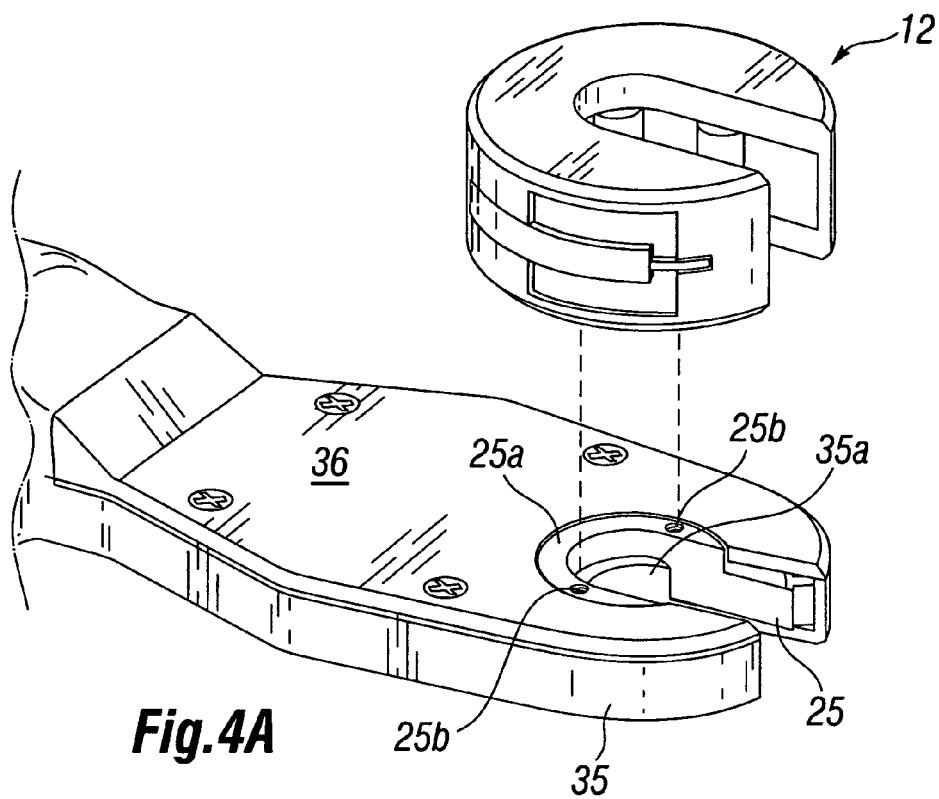
Figure 4B:
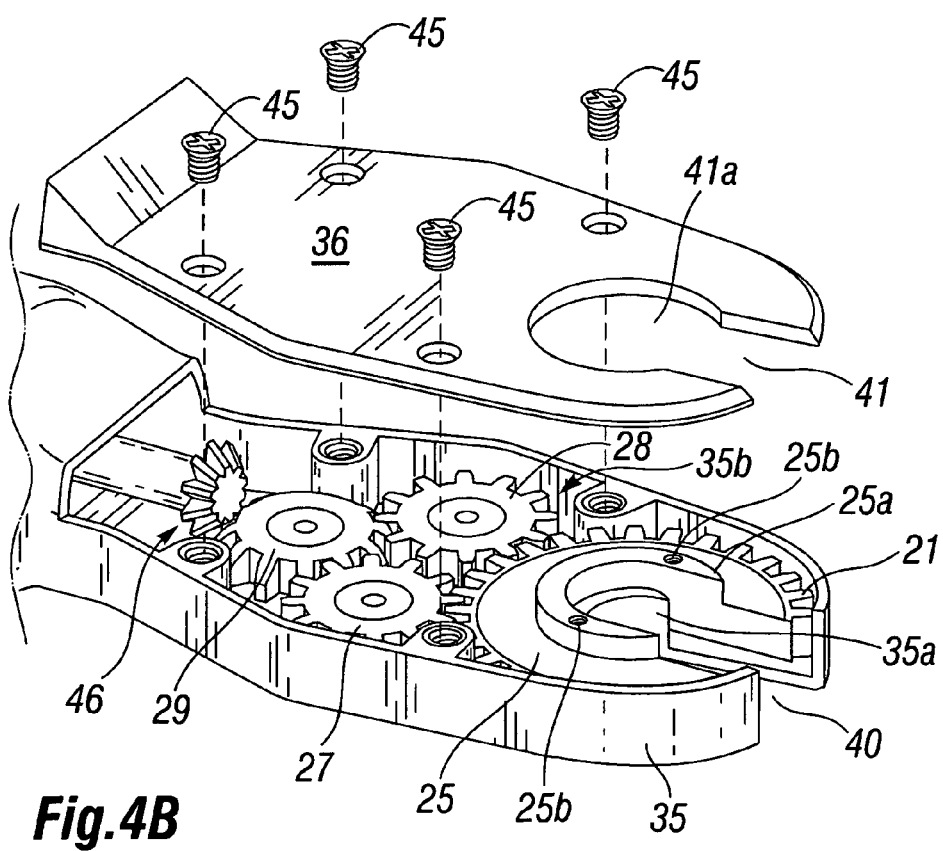
Figure 4C:
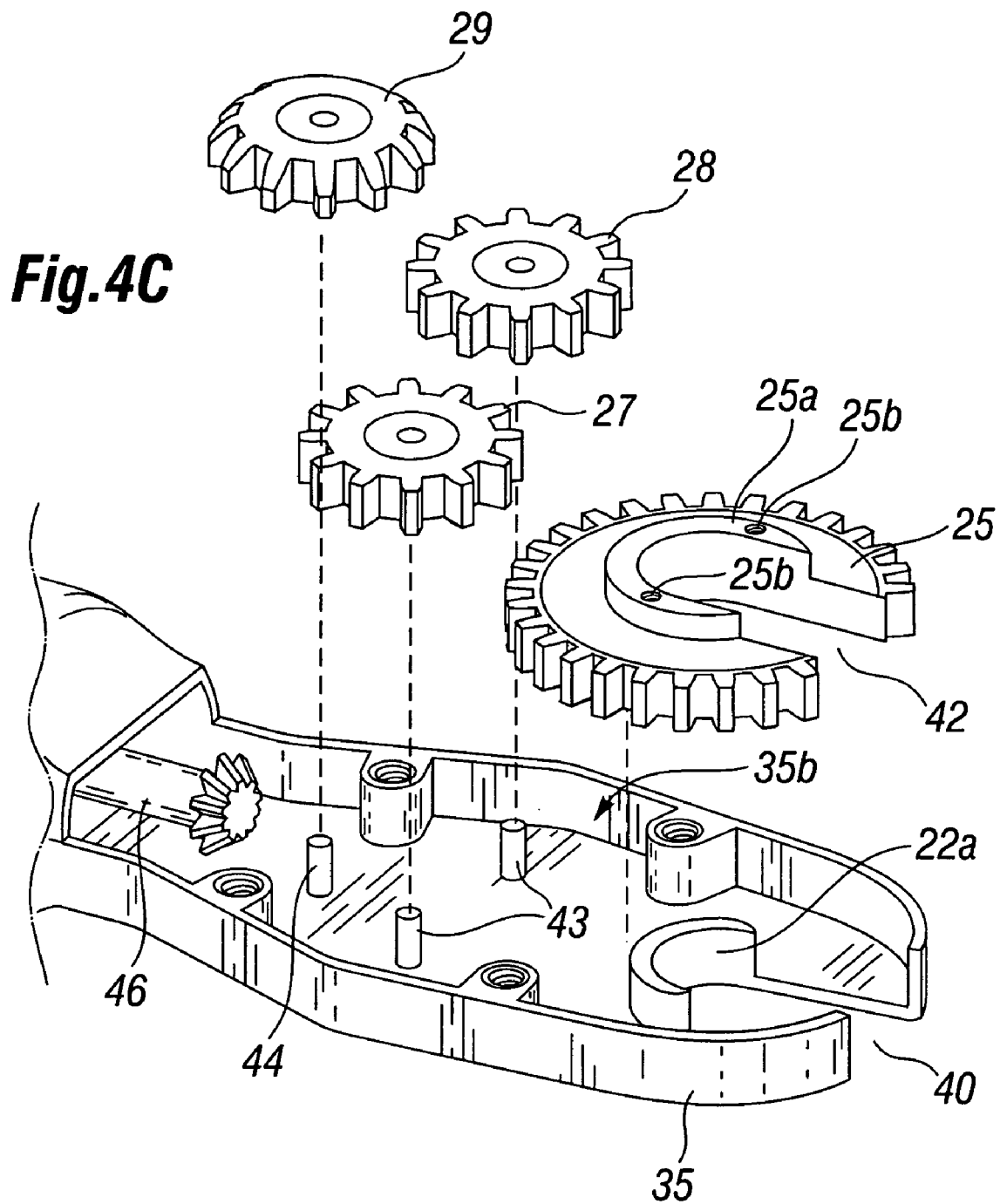
Figure 5A:
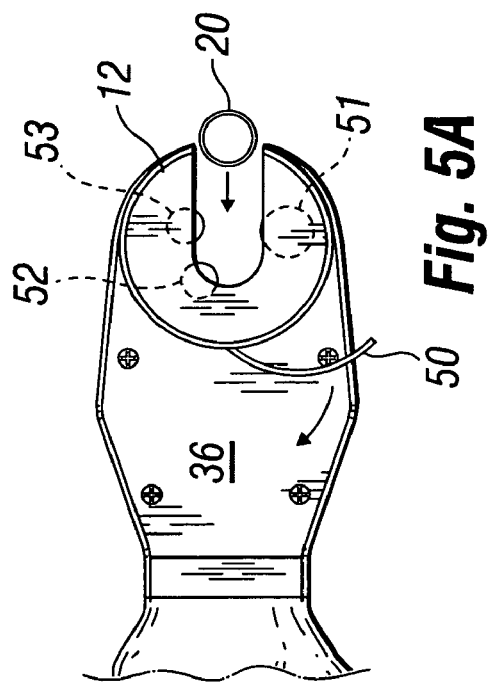
Figure 5B:
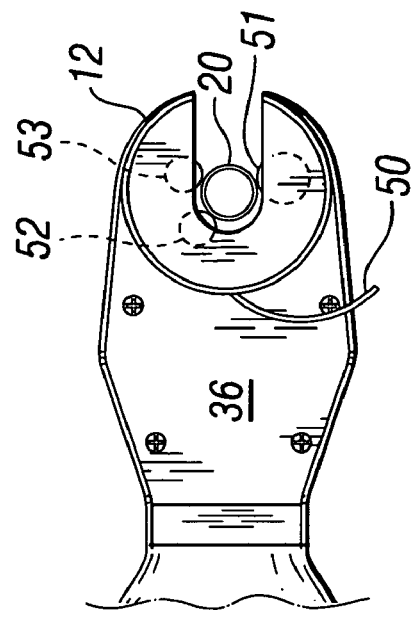
Figure 5C:
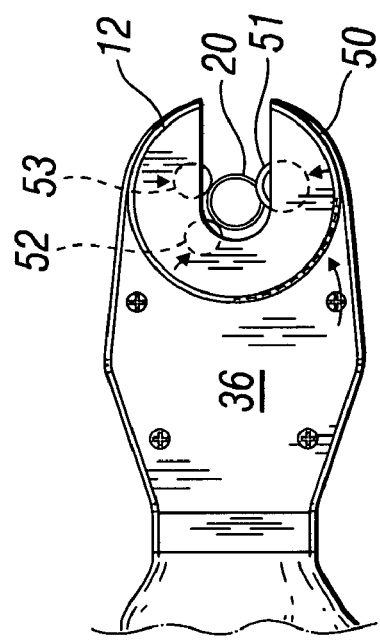
Figure 6A:
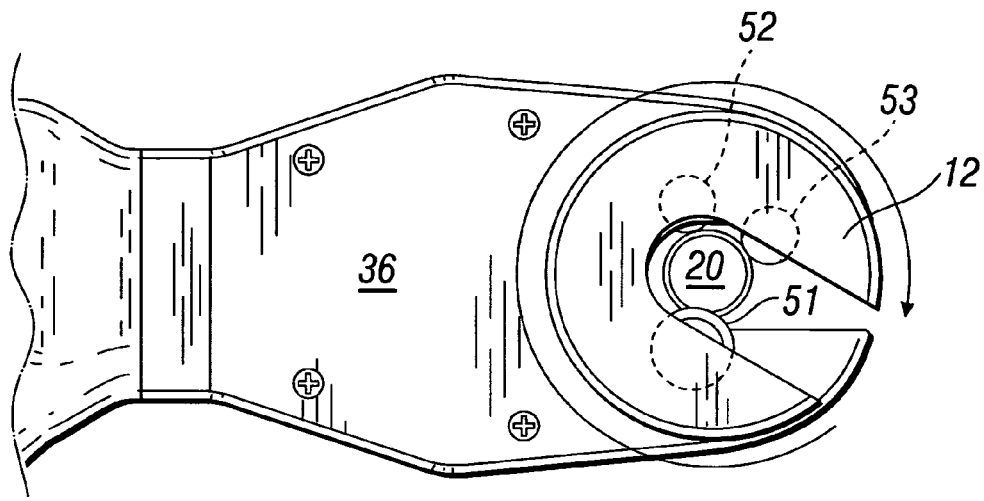
Figure 6B:
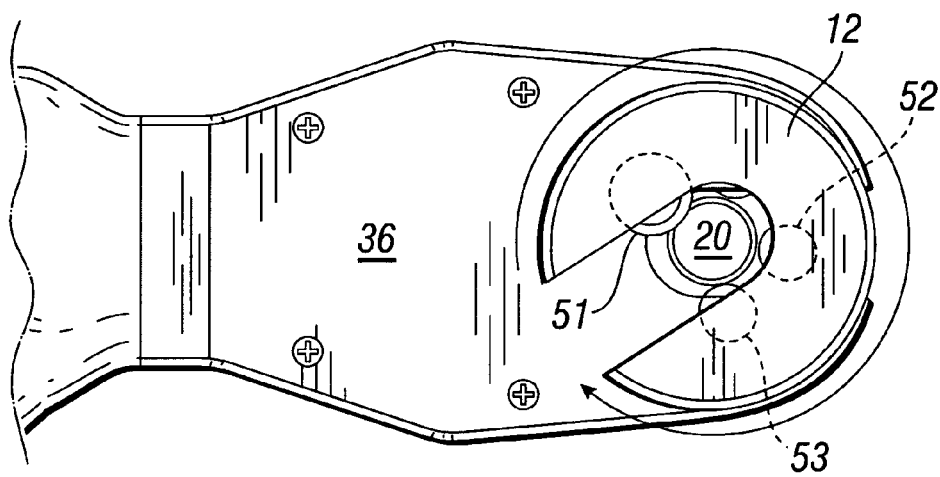
Figure 6C:
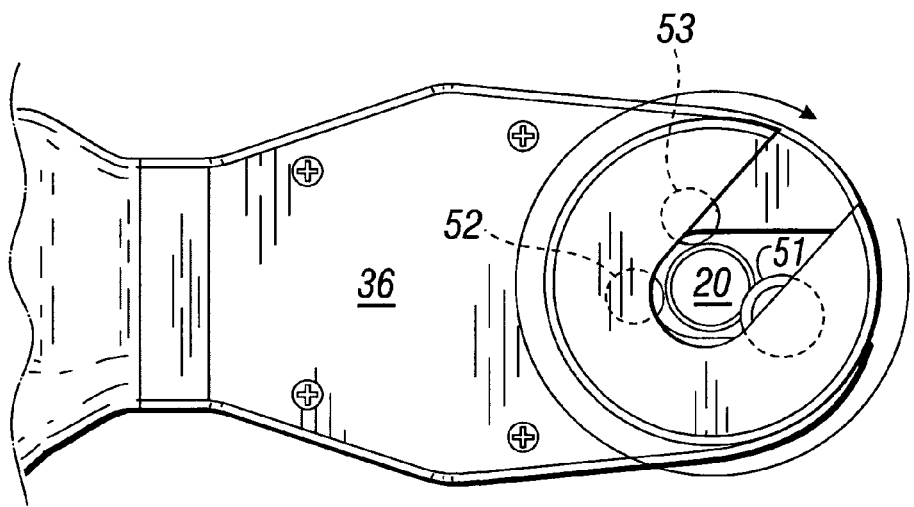
Figure 7A:
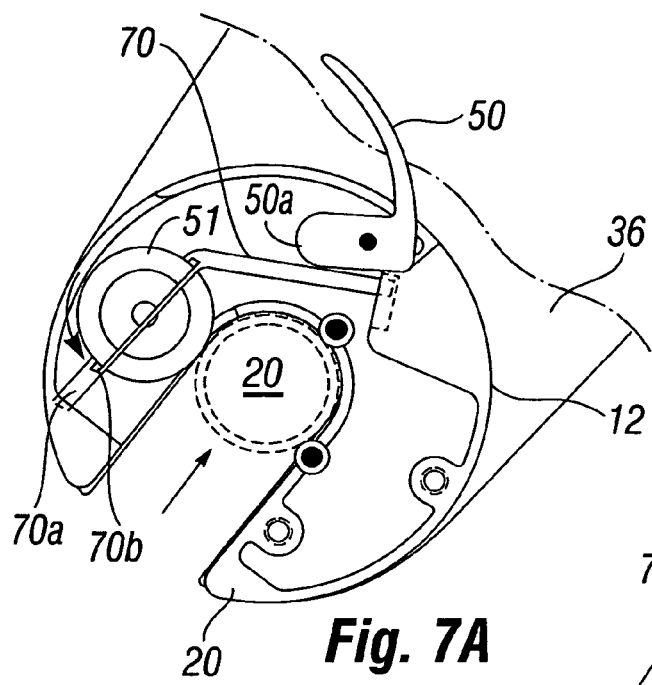
Figure 7B:
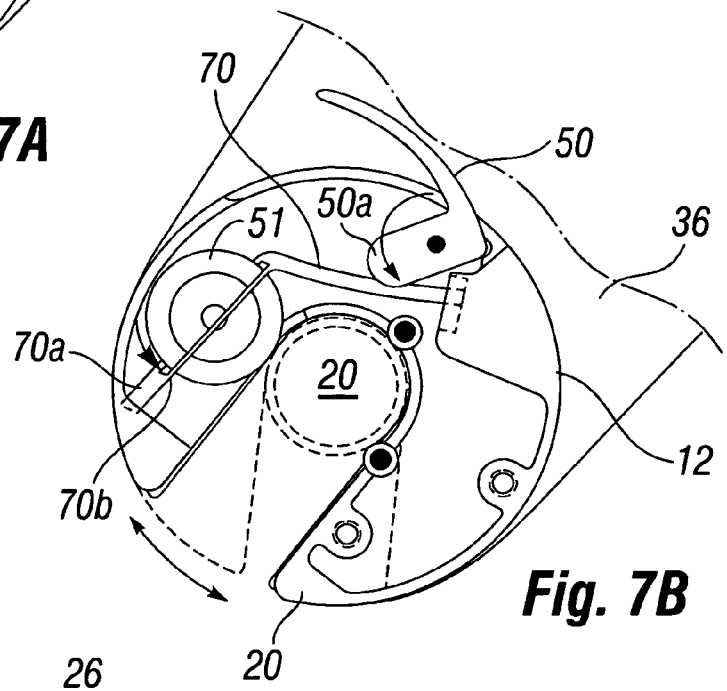
Figure 7C:
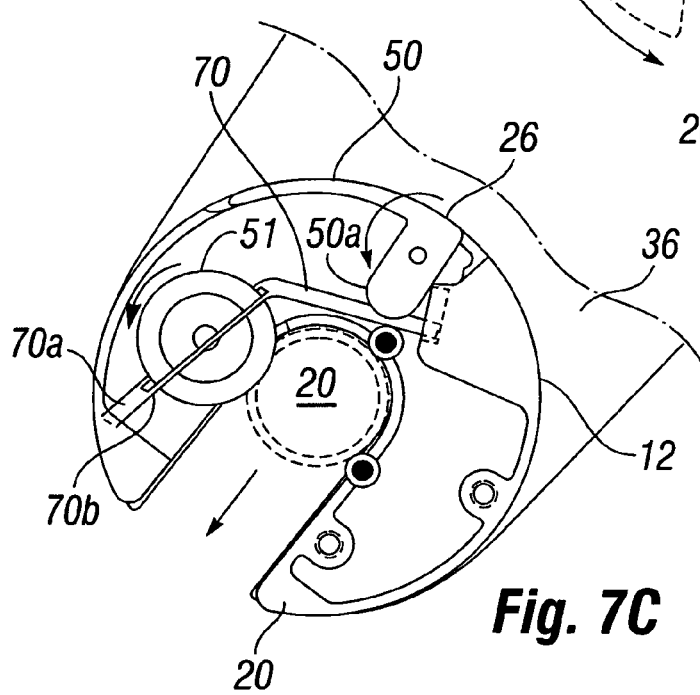
Figure 8:
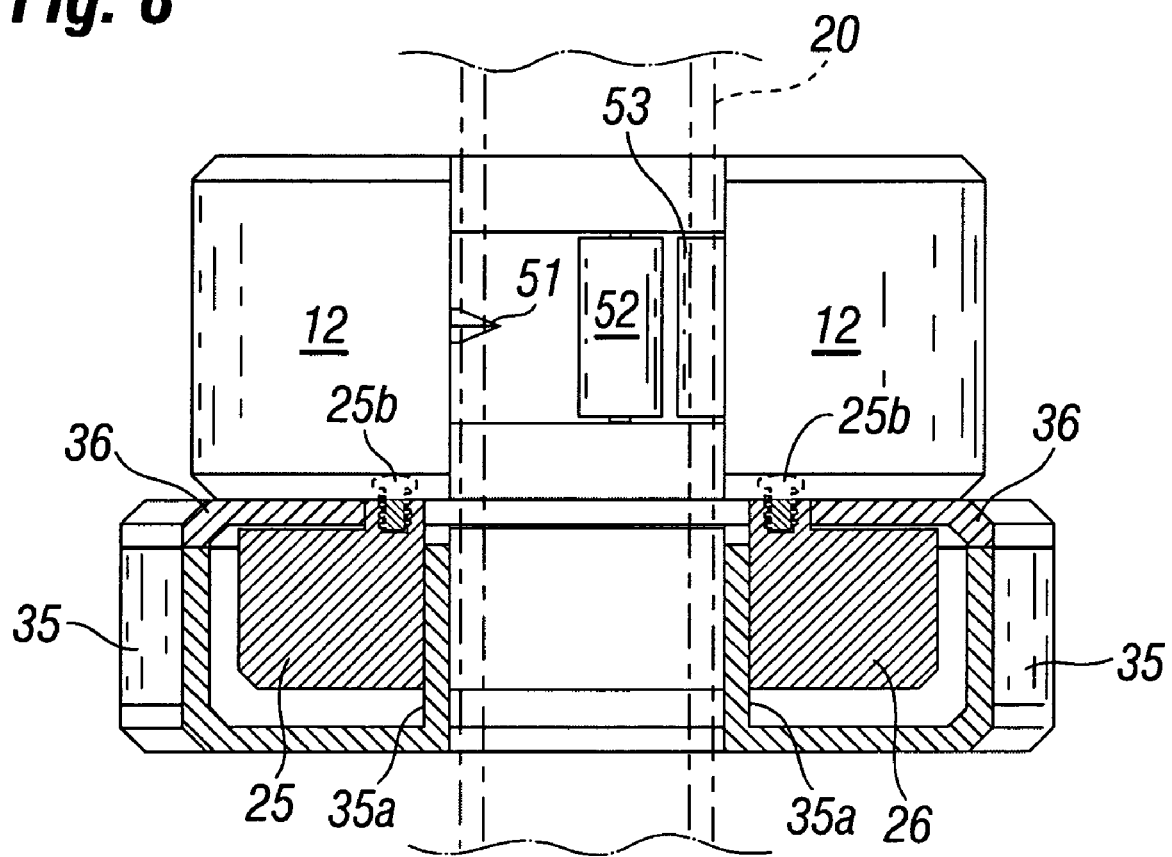
Figure 10A:
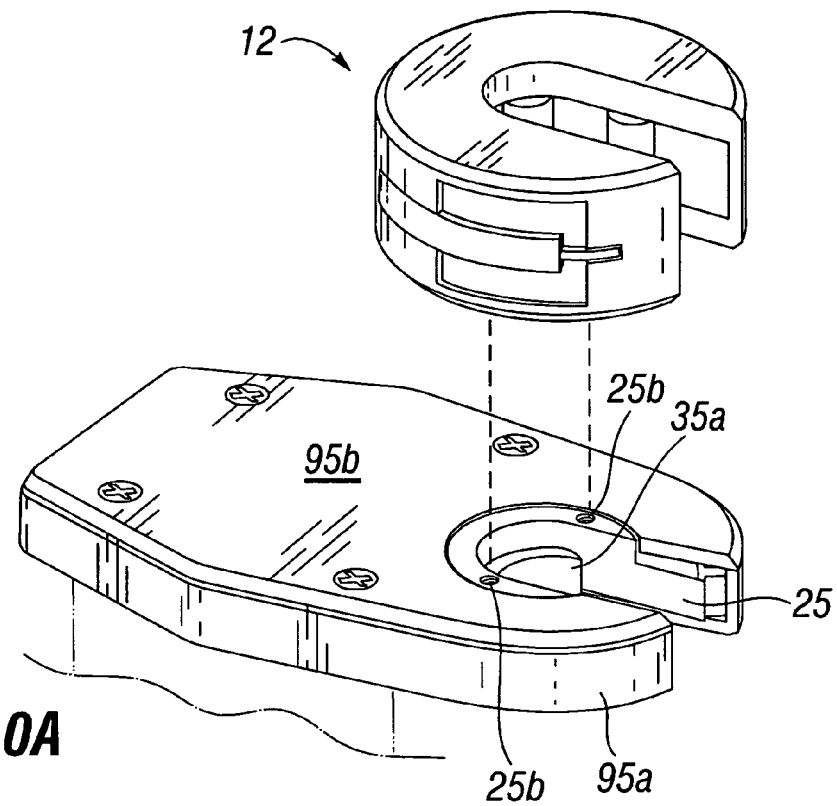
Figure 10B:
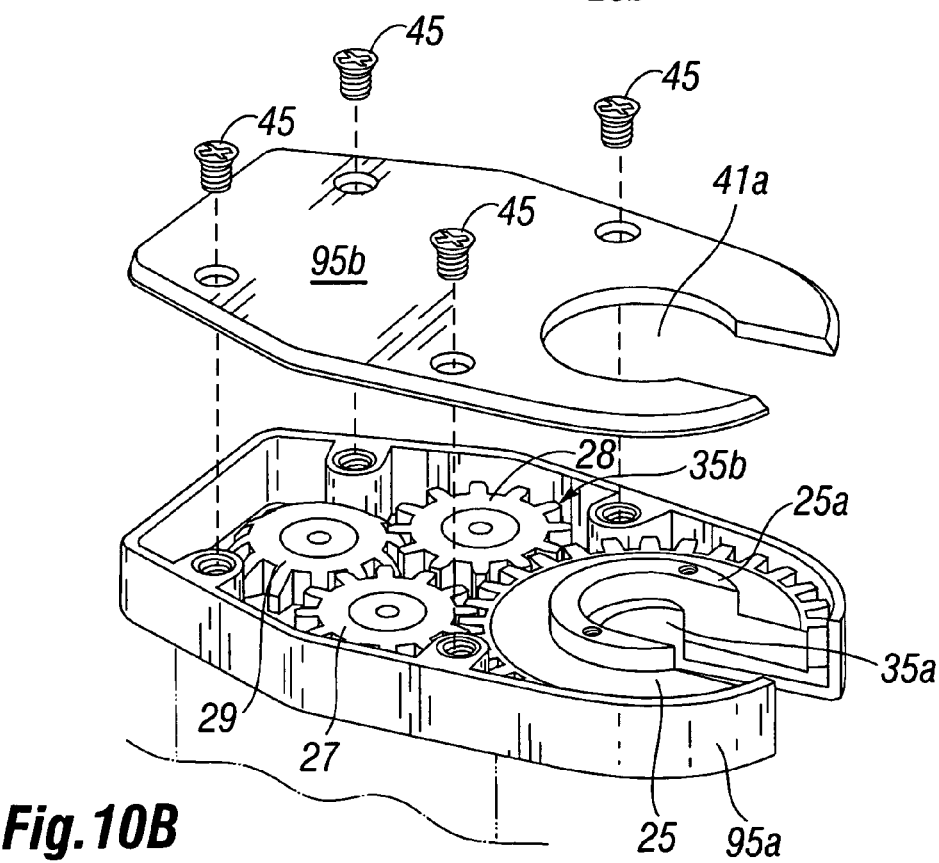

FIG. 4A indicates mounting of the cutting head to the gear system of the embodiment of FIG. 3;

FIG. 4B illustrates arrangement of the gear system of the embodiment of FIG. 3;

FIG. 4C is an exploded view of the gear system of the embodiment of FIG. 3;

FIG. 5A indicates closing of the cutting head of the invention tubing with the tubing to be cut;

FIG. 5B indicates the cutting head properly positioned about the tubing in preparation for cutting the tubing;

FIG. 5C indicates the cutting blade of the cutting head properly positioned for cutting the tubing;

FIG. 6A illustrates initial cutting of the tubing by rotation of the cutting head of the invention about the tubing;

FIG. 6B shows continued rotation of the cutting head about the tubing to continue the cutting operation;

FIG. 6C shows nearly complete cutting head rotation about the tubing;

FIG. 7A is a cut-away view illustrates the interior mechanism of the cutting head with the locking lever in the open position;

FIG. 7B illustrates partial closure of the locking lever urging contact of the cutting blade with the tubing;

FIG. 7C illustrates full closure of the locking lever with resultant cutting of the tubing;

FIG. 8 is a cross section view of the cutting head of the invention;

FIG. 9 illustrates a third embodiment of the tubing cutter apparatus in accordance with the invention;

FIG. 10A is an exploded view illustrating mounting of the cutting head of the invention to the gear system of the embodiment of FIG. 9; and FIG. 10B is an exploded view illustrating the gear mechanism of the embodiment of FIG. 9.

DESCRIPTION

Figure 1:
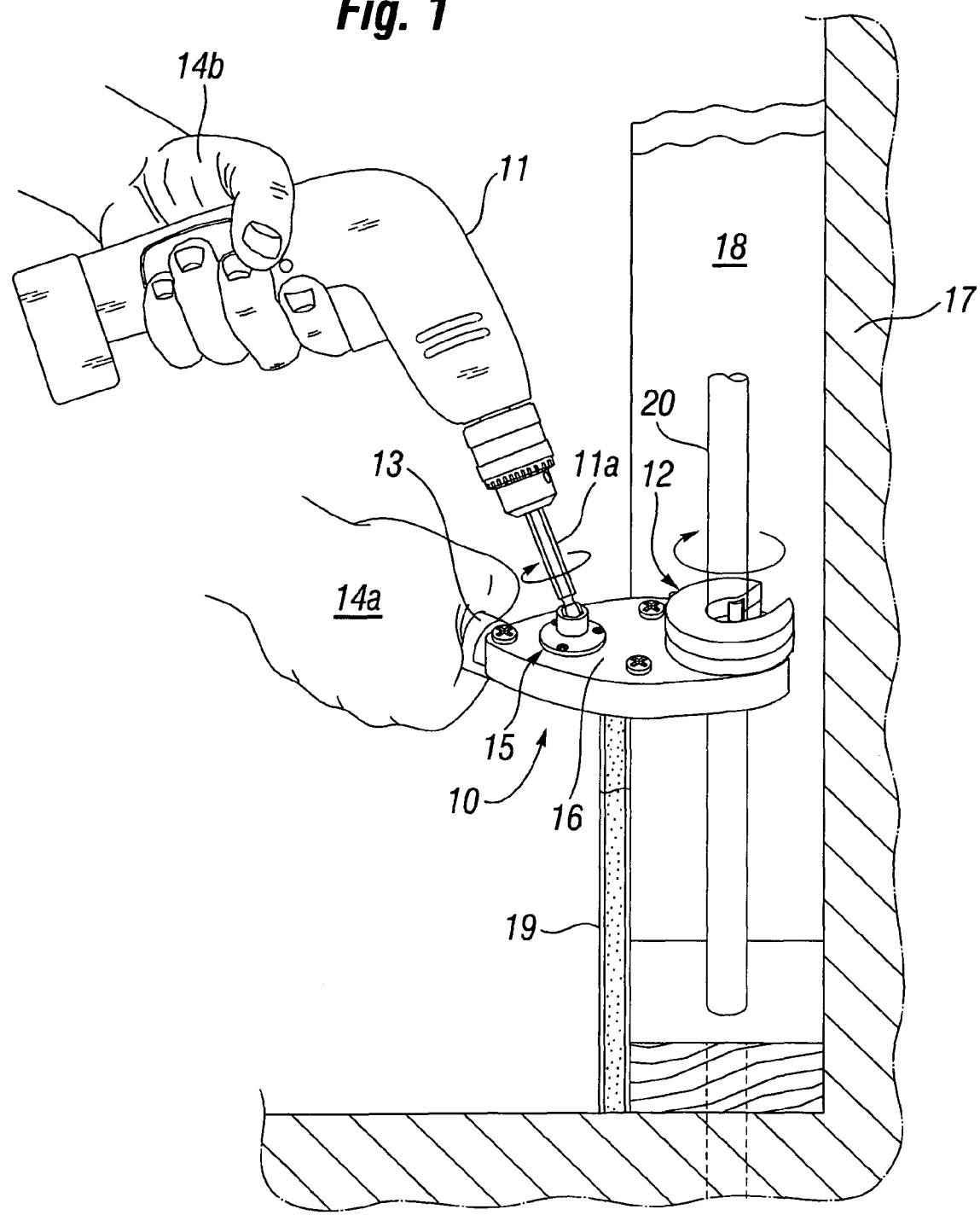
FIG. 1 is a perspective view illustrating an embodiment of tubing cutter apparatus in accordance with the present invention.

Referring to FIG. 1 there is illustrated a representative embodiment of the tubing cutting apparatus of the invention, generally designated 10, showing the method in which the apparatus 10 is used in cutting a tubing 20. In this embodiment the cutting apparatus 10 is used in combination with hand-held power tool 11. As shown, the tubing 20 is located in a confined area as indicated by the interior wall at 17, framework stud 18, and a section of interior drywall 19. Portions of drywall 19 are not shown so as to illustrate access to the tubing 20, the configuration of cutting apparatus 10 providing sufficient clearance to position the cutting head, generally designated 12, onto the tubing 20. Also, since the driving force of cutting head 12 is obtained from the spaced apart power tool 11, there is no problem in operating the cutting head 12 within the confined area.

Power tool 11 may for example be an electric drill or an electric screwdriver, and may be of either the cord or cordless type. The gripping handle 13 of apparatus 10 is grasped by one hand 14a of the user while the power tool 11 is held in the other hand 14b; the cutting apparatus 10 then positioned onto the tubing 20 to be cut. The rotary driving element 11a of power tool 11 is inserted into or connected to the gear coupling mechanism, generally designated 15, connected to the gear system of the cutting apparatus 10. With activation of the power tool 11 the gear system of the cutting apparatus causes rotation of the cutting head 12 whereby after a few revolutions of cutting head 12, typically in two to three seconds, tubing 20 is cut as desired. The coupling mechanism 15 may include a universal joint (not shown) having one end coupled to the rotary driving element 11a of the power tool 11 and the other end connected to the gear system of cutting apparatus 10.

Figure 2:
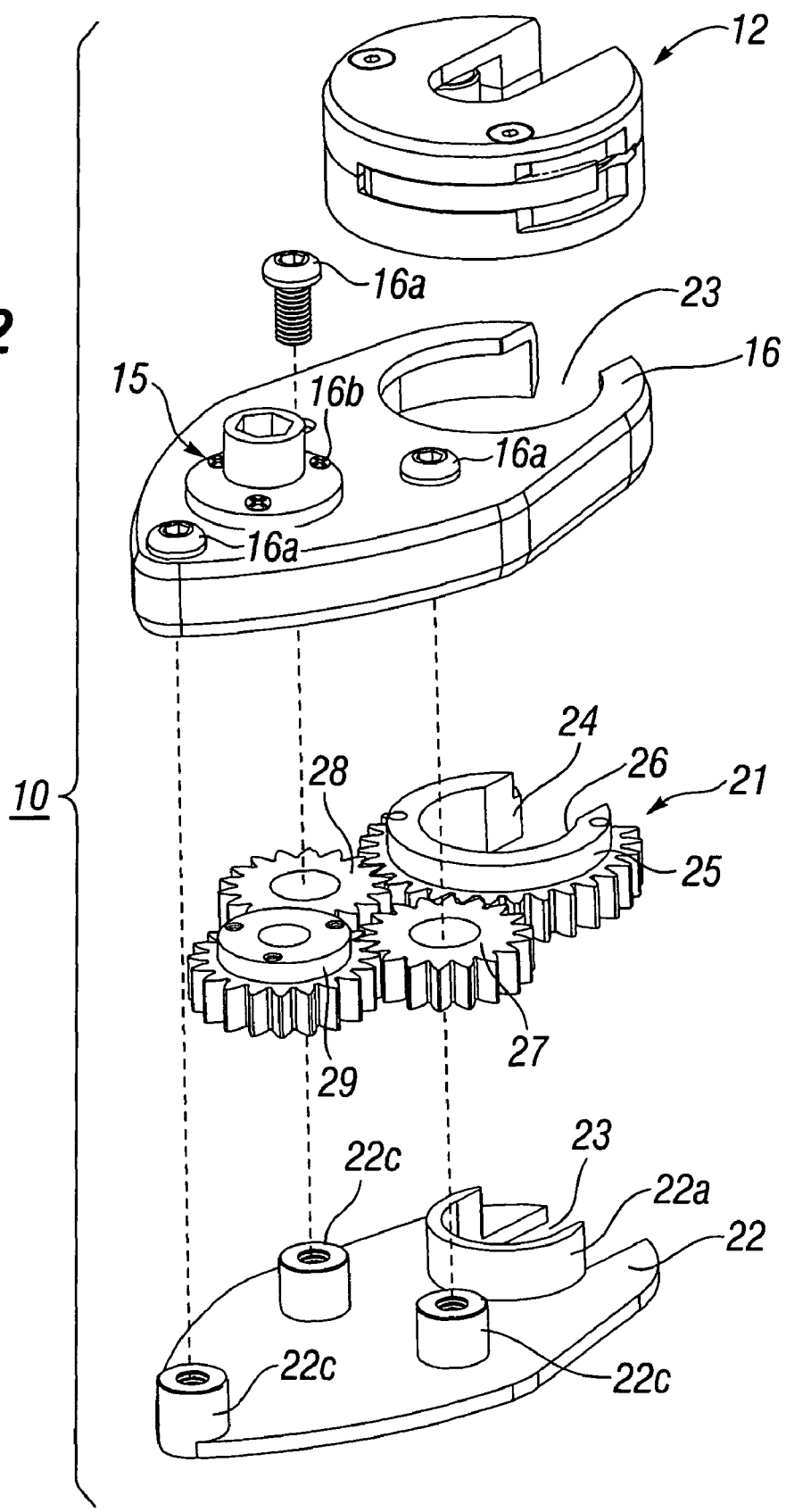
FIG. 2 is an enlarged exploded view illustrating mounting of the cutting head to the gear system of the embodiment of FIG. 1.

FIG. 2 is an exploded view illustrating an embodiment of the cutting apparatus 10 of FIG. 1 and the method of driving the cutting mechanism 10. Shown is cutting head 12, cover 16, gear system 21, and base plate 22. Cover 16 includes coupling mechanism 15 and three each of threaded retaining bolts 16a and retaining screws 16b (only one designated). Also shown is opening 23 for receiving tubing 20.

Gear system 21 includes in planar arrangement and sequence of connection, a C-shaped gear 25, a pair of intermediate circular gears 27, 28 that do not engage each other, and a circular driving gear 29. Both intermediate gears 27, 28 engage C-shaped gear 25 and on the opposite side engage driving gear 29. In this manner driving gear 29 engages and simultaneously rotates both intermediate gears 27, 28 and in turn intermediate gears 27, 28 engage and simultaneously rotates C-shaped gear 25. Two intermediate gears 27, 28 are required in that for some rotational positions, one or the other of intermediate gears 27, 28 will be in the gap in the C-shaped gear defined by shoulders 24, 26 and hence will be out of contact with C-shaped gear 25. Thus, intermediate gears 27, 28 are positioned so that at least one of these gears is always in contact the C-shaped gear 24 such that there is no break in the rotation of C-shaped gear 25. Power tool connector member 15 extends through cover 16 and is secured to driving gear 29 by means of screws 16b. C-shaped gear 25 has a raised portion 25a for attachment to cutting head 12 as will be described.

Base plate 22 has three mounting posts 22c, two for rotatably receiving intermediate gears 27, 28 which are secured by two of retaining bolts 16a to base plate 22, and one for receiving the third retaining bolt 16a, the retaining bolts 16a also serving to secure cover 16 to base plate 22 thereby capturing gear system 21. A semi-cylindrical bearing sleeve 22a is vertically attached to base plate 22 and when the cutting apparatus is assembled extends upward through the open area of C-shaped gear 25 to provide a bearing about which gear 25 rotates.

FIG. 3 illustrates in perspective view a second embodiment, generally designated 30, in accordance with the invention. Shown in longitudinally extending arrangement is a handle case having a battery compartment 31, hand gripping portion 32, driving motor compartment 33 with on-off switch 34, and extending base section 35 having cover plate 36. Cutting head 12 is shown attached to the apparatus gear system, as will be explained, for rotating cutting head 12. When on-off switch 34 is in the "on" position the batteries activate the driving motor which in turn through the gear system activates cutting head 12 to cut tubing 20. In operation, the user grasps the hand gripping handle section 32, pushes the cutting head 12 onto tubing 20 at the selected cutting location and operates on-off switch 34 effecting rotation of the cutting head 12 about tubing 20. After a few revolutions tubing 20 is cut as desired. As illustrated the tubing 20 is located in a confined area, however, since the configuration of apparatus 30 provides that the driving force is sufficiently spaced apart from the cutting head 12, the apparatus 30 does not cause unwanted interference in the vicinity of the tubing 20 during the cutting procedure.

FIGS. 4A-4C are exploded views illustrating positioning of the components of the embodiment 30 (FIG. 3) of the invention, FIG. 4A illustrating mounting of the cutting head 12 to a C-shaped gear 25 of the gear system 21, FIG. 4B illustrating arrangement of the gear system, and FIG. 4C being an exploded view of the gear system. The gear system of embodiment 30 is the same as that of embodiment 30 of FIG. 1 except for the means for powering driving gear 29 as will be described.

As indicated in FIG. 4A cutting head 12 is fixedly attached at fastener locations 25b (two shown) of a raised circular portion 25a of C-shaped gear 25, the raised portion providing adequate clearance for cutting head 12 to rotate freely above cover plate 36 in response to rotation of C-shaped gear 25. Extending base section 35 is formed as a cavity for receiving the gear system of embodiment 30, the base of the cavity having an integral vertically extending semi-cylindrical fixed bearing sleeve 35a around which the C-shaped gear 25 rotates, C-shaped gear 25 having a raised portion 25A extending upward through cover 36 to be attached to cutter 12. Bearing sleeve 35a is shown more clearly in FIG. 4C as being integral to and extending upward from the base of cavity 35b and forming a bearing about which C-shaped gear 25 rotates in response to activation of the embodiment driving motor.

FIG. 4B illustrates arrangement of the gear system 21 within the planar bottomed cavity, generally indicated as 35b, of extending base section 35 and as captured by cover 36. The gear system 21 is the same as that of embodiment 30 of FIG. 3 except for the addition of gear 46 which is activated by the motor to rotate driving gear 29. Cavity 35b can be formed having a planar base integral to extending base section 35 or alternatively by a planar bottom cover for extending section 35. Extending section 35 and cover plate 36 have corresponding entrance openings 40, 41, respectively, for accepting tubing 20. Entrance 40 is generally U-shaped, the base of the "U" being circular in configuration and having a diameter generally the same as the width of the entrance opening 40. Cover plate entrance 41 is terminated in an enlarged circular opening 41a having a diameter adequate for receiving raised portion 25a of gear 25 therethrough. Gear 25 is C-shaped in a circular manner with a planar bottom and having teeth on the periphery thereof, the opening 40 corresponding to opening 41 of cover 36. Inwardly of the teeth of gear 25 is the raised, or stepped-up, portion 25a forming a platform extending upwardly through the circular opening 41a of cover plate 36 for cutting head 12 to be fixedly attached thereto at fastener points 25b. With attachment over cavity 35b, cover 36 forms a semi-circular channel defined by bearing sleeve 22a and the sidewalls of cavity 35b through which the gear 25 rotates. Thus, as described, cover plate 36 captures the gear 25 within the cavity 35b and the raised stepped platform of gear 25 extends through cover 36 to provide adequate clearance for cutting head 12 to rotate.

As previously mentioned, the gear system 21 is the same as that of embodiment 30 of FIG. 3 except for gear 46 which is activated by the motor to rotate driving gear 29. That is, the output shaft of the driving motor extends into the cavity of extending section 35 and is terminated by gear 46 which engages gear 29 to drive cutting head 12 through the combination of intermediate gears 27, 28 and C-shaped gear 25.

Thus, with rotation of the motor shaft, gear 46 rotates gear 29, which in turn rotates intermediate gears 27, 28 simultaneously, which in turn rotates C-shaped gear 25, which in turn rotates cutting head 12.

Cover plate 36 is secured to extending section 35 by means of fastening screws 45 as indicated. This arrangement establishes and maintains a spaced apart relationship between cover plate 36 and the base of the cavity of extending section 35, cover plate 36 preventing the various gears from coming off of their support posts. The circular open area 41a of the cover plate 36 corresponds approximately to the open area 40 in the base of the cavity in extending section 35. When attached, open area 41a is located in line with and opposite the open area 40 in base of the cavity in extending section 35. The cutting head 12 is located in line with the open area 41a upwardly from cover 36. C-shaped gear 25 is rotatably mounted about the bearing sleeve 22a intermediate the cavity base and the cover plate 36 in line with the open area 41a of cover plate 36. Gear 25 is secured to the adjacent side of cutting head 12 by appropriate fastening means at fastener locations 25b.

FIG. 4C is an exploded view of the gear system further illustrating the mounting of the gears 25, 27, 28 and 29. As indicated, C-shaped gear 25 is rotatably mounted about the bearing sleeve 22a, gears 27 and 28 are rotatably mounted to posts 43 which are secured to the base of the cavity, and gear 29 is rotatably mounted to post 44 which is also secured to the base of the cavity. Motor shaft gear 45 extends into the cavity positioned to engage gear 29.

FIGS. 5A-5C illustrate the manner in which the cutting head 12 is positioned onto tubing 20 for both the embodiment of FIGS. 1 and 3, the cutting head and basic gear system being the same for each. FIG. 5A indicates tubing 20 closing, as indicated by the arrow, with the receiving opening of the cutting head 12. As will be further explained below, locking lever 50 is in the open position for allowing spring urged recession of the rotatable cutting blade 51 (shown in phantom in FIG. 5A). Shown partially in phantom are fixed position rotatable support rollers 52, 53 for positioning tubing 20 within the cutting head 12 and facilitating easy rotation of cutting head 12 about tubing 20 during the cutting operation. FIG. 5B shows tubing 20 properly positioned in cutting head 12 against support rollers 52, 53 but not yet clamped by cutting blade 51. FIG. 5C shows clamping of tubing 20 by cutting blade 51 whereby, in cooperation with support rollers 52, 53, tubing 20 is firmly positioned for cutting. Cutting blade 51 includes spring means and cam configuration, the spring means urging recession of cutting blade 51 away from tubing 20 when lever 50 is in the open position; the cam configuration overcoming the spring means when lever 50 is in the closed position to force penetrating contact of the cutting blade 51 with the tubing 20.

FIGS. 6A-6C illustrate the tubing cutting procedure as the gear system rotates the cutting head 12 about the tubing 20. For illustrative purposes the rotation is shown as clockwise although this is not an operational requirement. In FIG. 6A lever 50 is closed to force cutting blade 51 into penetrating contact with tubing 20 and to effect initial cutting of tubing 20 by rotation of cutting head 12 about stationary tubing 20, support rollers 52, 53 facilitating easy rotation of cutting head 12. FIG. 6B shows further rotation of cutting head 12 about tubing 20 to continue the cutting rotation with FIG. 6C illustrating a nearly complete cutting rotation. After a few rotations tubing 20 is cut as desired.

FIGS. 7A-7C illustrate the manner in which spring means 70 is used in cutting head 12 for urging recession of cutting blade 51 away from tubing 20 when lever 50 is in the open position; lever 50 having a cam portion 50a that at closure of lever 50 overcomes the spring means 70 to force cutting contact of the cutting blade 51 with the tubing 20. FIG. 7A illustrates initial positioning of tubing 20 within the cutting head 12 with the locking lever 50 in the open position. The cam portion 50a of locking lever 50 rides on a tension spring 70, spring 70 having an extending portion 70a with a slot 70b for receiving cutting blade 51 therein. When lever 50 is in the open position spring 70 is in the unloaded state and cutting blade 51 in not impacting tube 20 in the cutting mode. FIG. 7B illustrates partial closure of the locking lever 50 with the cam portion 350a of lever 50 depressing to partially load spring 70 thereby urging contact of the cutting blade 51 with the tubing 20. FIG. 7C illustrates complete closure of the locking lever 50 whereby the spring 70 is loaded sufficiently to force cutting blade 51 to cut the tubing 20. After cutting of the tubing 20 the lever 50 is opened thereby unloading spring 70 whereby the cutting blade 51 returns to its non-cutting mode.

FIG. 8 illustrates in cross-sectional view the mounting of cutting head 12 to the C-shaped gear 25 of the gear system 21 of the invention as seen looking into the opening 25 as shown in FIG. 4A. As mentioned, cutting head 12 is fixedly attached to gear 25 by fastener means at locations 25b with gear 25 mounted for rotation about semi-cylindrical bearing sleeve 35a, bearing sleeve 35a integral to and extending upward from the base of extending portion 35. The raised portion 25a of gear 25 protrudes through opening 41a of cover plate 36 and behind bearing sleeve 35a, fastener locations 25b provided at the top of the raised portion 25a. Support rollers 52, 53 are also shown.

FIGS. 9, 10A and 10B illustrate a third embodiment 90 of a tubing cutting apparatus in accordance with the invention. In this embodiment a modified gear system compartment and gear system is shown wherein the attached cutting head 12 is mounted at a generally 90 degree angle to the previously described longitudinally extending arrangement of FIG. 3. The cutting head 12 and mounting thereof to the gear system is the same as previously described for the second embodiment.

FIG. 9 shows in longitudinally extending arrangement a handle base having a battery compartment 91, hand gripping portion 92, and motor compartment 93. Also located on compartment 93 (not shown) is the motor on-off switch. Compartment 93 further includes a flexible resilient clasp 94 for attaching embodiment 90 to a tubing 20. Mounted at a right angle to compartment 93 is a gear system compartment 95 having cutting head 12 mounted thereon as previously described. Gear system compartment 95 has base 95a and cover 95b. In operation of this embodiment the cutting head 12 and the attachment means 91 are aligned and suitably attached to the tubing 20 as indicated, after which the motor is started and the tubing 20 cut as desired. It is not necessary to hold the apparatus in place by hand during the cutting operation.

FIG. 10A is an exploded view illustrating mounting of the cutting head 12 to the gear system of the embodiment 90 of FIG. 9. As shown, in this third embodiment the cutting head 12 and mounting thereof to the gear system is the same as previously described for the second embodiment.

FIG. 10B is an exploded view illustrating the gear compartment and modified gear system of this embodiment. The modified gear system is the same as the gear system of the embodiment of FIG. 4B except since gear compartment 95 is mounted at a generally 90 degree angle to the previously described longitudinally extending arrangement of FIG. 3, the driving gear 29 is connected directly to the motor output shaft. In the operation of embodiment 90 the cutting head 12 and the attachment means 94 are aligned and suitably attached to the tubing 20 as indicated, after which the motor is started and the tubing 20 cut as desired. With this embodiment it is not necessary to hold the apparatus in place by hand during the cutting operation.

The invention has been shown and described with reference to specific illustrated embodiments. It is realized that those skilled in the art may make changes or modifications in the invention without departing from the true scope and spirit of it. Therefore, the scope and spirit of the invention should not be limited to the embodiments discussed, but only by the invention as claimed.

What is claimed is:

1. Tubing cutter apparatus comprising:
    a substantially C-shaped cutting mechanism having an open central area for receiving a length of tubing and a cutting blade located in said cutting mechanism for cutting the tubing;
    a gear mechanism including a semi-circular substantially C-shaped first gear fixedly attached to said cutting mechanism, a pair of substantially identical intermediate gears positioned for simultaneously engaging said first gear, and a third gear engaging both said intermediate gears simultaneously for causing simultaneous rotation of said intermediate gears;
    said gear mechanism having a housing including a base plate and a generally parallel cover plate, said cover plate and said base plate having open areas corresponding to said cutting mechanism open area, said first gear attached to said cutting mechanism through the open area of said cover plate;
    said gear mechanism including a semi-cylindrical sleeve fixedly attached to said base plate and extending upwardly therefrom to form a bearing about which said first gear rotates unattached to said base plate with the opening of said C-shaped first gear coacting with the openings of said cutting mechanism, said cover plate and said base plate for receiving and cutting said tubing;
    said first gear, said intermediate gears and said third gear are in planar arrangement within said housing with said intermediate gears rotatably mounted on support post means secured to said base plate;
    said first gear, said sleeve and said housing configured to provide a semi-circular channel through which said first gear rotates;
    a rotary power source for rotating said third gear thereby through said intermediate gear and said first gear to rotate said cutting mechanism,
    said rotary power source including a handle case extending at substantially a 90 degree angle from said gear mechanism housing, said handle case defining a longitudinal axis and having therewithin a motor with an output shaft coupled to said third gear for rotating said third gear and a battery for powering said motor, and
    a clamp for removably attaching said apparatus to a length of tubing so that the tubing extends parallel to said longitudinal axis, said clamp being attached to said handle case at a location spaced longitudinally from said cutting mechanism, said clamp having laterally spaced apart jaws having therebetween an open area longitudinally aligned with said open central area of said cutting mechanism, said jaws having outer longitudinal edges maintained by spring tension at a distance less than the diameter of a length of tubing which said apparatus is intended to be used with, said jaws being springingly separateable by pressing said longitudinal edges of said jaws against the outer circumferential wall surface of a length of tubing to thereby position said tubing within said open area between said jaws and maintain said tubing in said position by a compressive spring force exerted on said tubing by said jaws.

2. The tubing cutter apparatus of claim 1 wherein said cover plate is secured to a support post secured to said base plate in a parallel spaced-apart manner for containing said gear mechanism and wherein:
    the open area of the cover plate corresponds to the open area in said base plate and is positioned opposite the open area in said base plate;
    said cutting mechanism is located above said cover plate in line with said open area in said cover plate; and
    said C-shaped gear is located intermediate said base plate and said cover plate in line with the open area on said cover plate and is fixedly secured to the adjacent side of said cutting mechanism.

3. Tubing cutter apparatus in accordance with claim 1 wherein said cutting mechanism includes;
    spring means for determining the relative positions of said cutting blade and said tubing,
    lever means for overcoming said spring means to force cutting contact of said cutting blade with said tubing, said lever means having a cam portion for loading or unloading said spring means;
    closure of said lever means causes loading of said spring means by said cam portion to provide cutting contact of said cutting blade and said tubing; and
    opening of said lever means causes unloading of said spring means to urge recession of said cutting blade from said tubing to prevent cutting of said tubing.

4. Tubing cutter apparatus in accordance with claim 1 wherein said cutting mechanism includes spring means for biasing said cutting blade away from said central open area of said cutting mechanism and lever means for overcoming said spring means to force cutting contact of said cutting blade with said tubing.

5. Tubing cutter apparatus of claim 4 wherein said lever means has a cam portion for loading or unloading said spring means, wherein closure of said lever means causes loading of said spring means by said cam portion to provide contact of said cutting blade and said tubing and opening of said lever means cause unloading of said spring means to urge recession of said cutting blade from said tubing to prevent cutting of said tubing.

6. Tubing cutter apparatus of claim 1 including a blade support mechanism for movably supporting and urging said cutting blade into cutting contact with a length of tubing in said central area of said cutting mechanism.

7. Tubing cutter apparatus of claim 6 wherein said cutting blade has a circular shape.

8. Tubing cutter apparatus of claim 7 wherein said cutting blade is rotatably mounted to said blade support mechanism.

9. Tubing cutter apparatus of claim 1 wherein said C-shaped first gear has a coaxial C-shaped ridge which protrudes axially therefrom, said ridge being fixedly coupled to said cutting mechanism.

10. Tubing cutter apparatus of claim 1 wherein said clamp is further defined as being a tubular plate spring having a substantially C-shaped transverse cross-sectional shape comprised of substantially cylindrically-shaped tube having in an outer circumferential wall surface therein a longitudinally disposed slot, longitudinally disposed edge walls of said tube on opposite sides of said slit being curved circumferentially apart to form arcuately curved flanges.

* * * * *